United States Patent
Sheu (10) Patent No.: US 6,278,826 B1
(45) Date of Patent: Aug. 21, 2001

(54) CABLES WITH WATER-BLOCKING AND FLAME-RETARDING FOAM

(75) Inventor: Jim J. Sheu, Dunwoody, GA (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/396,953

(22) Filed: Sep. 15, 1999

(51) Int. Cl.$^7$ .................................................. G02B 6/44
(52) U.S. Cl. ...................... 385/109; 385/102; 385/106; 385/112; 385/114
(58) Field of Search ................................ 385/102, 106, 385/109, 112, 114

(56) References Cited

U.S. PATENT DOCUMENTS

| | | | |
|---|---|---|---|
| 4,725,391 | 2/1988 | Bardhan et al. | 264/82 |
| 4,725,628 | 2/1988 | Garvey et al. | 521/137 |
| 4,725,629 | 2/1988 | Garvey et al. | 521/137 |
| 4,818,060 | 4/1989 | Arroyo | 350/96.23 |
| 4,913,517 | 4/1990 | Arroyo et al. | 350/96.23 |
| 5,016,952 | 5/1991 | Arroyo et al. | 350/96.2 |
| 5,133,034 | * 7/1992 | Arroyo | 385/107 |
| 5,243,675 | * 9/1993 | Kathiresan | 385/102 |
| 5,621,841 | 4/1997 | Field | 385/113 |
| 5,698,615 | 12/1997 | Polle | 523/173 |
| 5,763,067 | * 6/1998 | Bruggermann | 428/317.9 |
| 6,091,871 | * 7/2000 | Elisson | 385/113 |

FOREIGN PATENT DOCUMENTS

| | | |
|---|---|---|
| 0434254 | * 6/1991 | (EP) . |
| 2061079A | * 5/1981 | (GB) . |
| 2159291A | * 5/1984 | (GB) . |
| 2161655 | * 1/1986 | (GB) . |

* cited by examiner

Primary Examiner—Cassandra Spyrou
Assistant Examiner—Leo Boutsikaris
(74) Attorney, Agent, or Firm—Thomas, Kayden, Horstemeyer & Risley, LLP.

(57) ABSTRACT

A preferred embodiment of the cable of the present invention incorporates a core, an outer jacket surrounding the core, and a super-absorbent foam disposed between the core and the outer jacket as well as inside the core. The super-absorbent foam comprises a polyurethane or similar type foam loaded with super-absorbent polymers (SAPs) which exhibit both water-blocking and flame-retarding characteristics. Additionally, the foam preferably is provided with a moisture content of greater than approximately 0 percent, by weight, thereby improving the flame-retarding characteristics of the foam.

14 Claims, 7 Drawing Sheets

CABLES WITH WATER-BLOCKING AND FLAME-RETARDING FOAM

CROSS-REFERENCE TO RELATED APPLICATIONS

Reference is made to U.S. patent application Ser. No. 09/258,491 filed on Feb. 26, 1999; Ser. No. 09/258,533, filed on Feb. 26, 1999; now U.S. Pat. No. 6,173,100 and Ser. No. 09/392,166, filed on Sep. 8, 1999.

BACKGROUND OF THE INVENTION

1. Field of the Invention

The present invention relates to cables and, in particular, to optical fiber cables incorporating a foam which imparts water-blocking and flame-retarding characteristics to the cables.

2. Description of the Related Art

Many products, such as telecommunications and power cables, for instance, typically are provided with one or more forms of water-blocking protection, i.e. waterproof outer jackets, water-blocking powders and yarns, etc. Generally, such water-blocking protection is intended to reduce or eliminate the possibility of water entering the product so as to reduce the potential for water damage or for impairment of transmission. For example, once water enters a telecommunications cable, such as through a splice closure of the cable, freezing of the water can induce microbending in the optical fibers of the cable, which can result in fiber degradation or increased signal loss of the cable.

Heretofore, some prior art cables have incorporated water-blocking material in order to prevent water penetration into and migration through the cables. An example of such a prior art cable is described in U.S. Pat. No. 5,390,273, issued to Rahman, for instance. In the cable described therein, water-blocking material is disposed in any otherwise empty space within a fluid impervious tube surrounding a plurality of optical fibers and between the barrier layer and the tube. The water-blocking and/or hydrogen-absorbing compound can be in the form of a known type of grease and can be thixotropic so that there can be movement of the optical fibers with respect to each other and to tubes in the cable. Known types of water-blocking compounds include a silicone-based thixotropic compound, a compound based on hydrocarbon oils or polymeric liquids, such as polybutylene, and petroleum greases. The use of such a filling materials causes housekeeping problems, though, because these compositions of matter are somewhat messy to apply and require a cleaning agent, such as a solvent, to remove the filling compound to facilitate subsequent splicing. Also, care must be taken so that these agents do not affect adversely coloring material or coating material on the optical fiber. What is sought after is a cable in which the core is not filled with a grease-like material, but rather includes other provisions for blocking water flow along the core.

Heretofore, some prior art cables have also incorporated water-blocking tape in order to prevent water penetration into and migration through the cables. Examples of such prior art cables are described in U.S. Pat. No. 4,867,526, issued to Arroyo, for instance. In the cables described therein, water-blocking tape is disposed between the transmission media and the outer jacket of the cable, thereby forming a water-blocking barrier around the transmission media, i.e. optical fibers. The water-blocking tape incorporates super-absorbent materials, e.g. super-absorbent polymers (SAPs), which can absorb up to about one thousand (1000) times their weight in distilled water. The SAPs are provided in a loading of approximately 3.8–6.22 g/ft$^2$. This process results in a tape that weighs approximately 10–80% more than the substrate of the tape. Upon contact with water, the SAPs of the water-blocking tape absorb the water and swell, thereby preventing migration of the water through the cable. Additionally, the swollen SAPs form a physical barrier which can prevent more water from entering the cable.

Heretofore, a prior art solution to attain the characteristics of water-blocking and flame-retarding has been to add flame-retardants to the SAPs of the tape. However, adding flame-retardants to the SAPs oftentimes results in a tape which has reduced water-blocking characteristics as compared to the tape without the flame-retardants. Primarily this is due to the chemical properties of the prior art flame-retardants which, typically are salts or ionic compounds and are known to reduce the swelling of water-blocking materials. Generally, as more prior art flame-retardants are added to the SAPs in an effort to improve the flame-retarding characteristics, the greater the water-blocking capacity of the SAPs is reduced. Frequently, the extent of reduction in water blocking capacity of SAPs due to the incorporation of prior art flame-retardants can render the SAPs incapable of preventing water penetration.

Other examples of prior art cables are described in U.S. Pat. No. 4,909,592, issued to Arroyo et al. These prior art cables incorporate a water blocking system within the core tube. The water blocking system comprises a tape or yarn or both or a plurality of tapes or yarns. The tapes or yarns are provided so as to intentionally cause the core to include voids, and do not completely fill the interstitial core area around the optical fibers disposed within the core tube. The interstitial voids allows the fibers to be substantially decoupled transversely from the sheath system of the cable. This allows substantial motion of the transmission medium in at least one transverse direction when the cable is stressed such as by bending of the cable. However, the creation of these voids may not effectively cushion and center the transmission medium within the core. Further, upon contact with water, the water blocking system may not swell enough so as to prevent water migration to the transmission medium.

One prior art closure which includes a super-absorbent foam water-blocking system is described in U.S. Pat. No. 5,016,952, issued to Arroyo et al. The prior art connections between transmission media of the cables are disposed between portions of a super-absorbent compliant foam material. Upon contact with water, the super-absorbent foam material swells, molding about the connections to protect them from water and expanding outwardly to seal any unintended openings in the housing and to prevent the ingress of additional water. However, this patent discloses a water-blocking foam that is only disposed about the cable connections. The cables of this prior art include a water-blocking material in the form of a tape or a yarn. Thus, the water-blocking foam was not disposed within the core tube of the cable.

Heretofore, another prior art solution to attain the characteristics of both water-blocking and flame-retarding has been to deposit the SAPs in the cable in powder form which has had some measure of success. However, there are problems with this method of water-blocking. First, the friction between the powder and the components of the cable causes high loss due to microbending. Second, because the powder is inserted into the cable via electrostatic deposition, the powder tends to settle to the bottom of the cable over time. Third, the powder can be difficult to apply evenly and some of the powder is lost during assembly. Fourth, the powder cannot be used inside the core tube due to microbending loss. For the same reason, the water-blocking tapes described hereinabove exhibit a lot of the same problems as the powder form does, due to the use of long woven surfaces.

Therefore, there is a need for improved cables that provide a water-blocking and flame-retarding means which address these and other shortcomings of the prior art.

BRIEF SUMMARY OF THE INVENTION

Certain objects, advantages and novel features of the invention will be set forth in the description that follows and will become apparent to those skilled in the art upon examination of the following or may be learned with the practice of the invention. The objects and advantages of the invention may be realized and attained by means of the instrumentalities and combinations particularly pointed out in the appended claims.

The present invention generally is directed to water-blocking foam with flame-retarding characteristics that are incorporated in cables. Examples of such cables include fiber optic, copper, and power cables, among others. In a preferred embodiment, the core tube of the cable includes a one or more optical fibers, or other transmission medium, that are surrounded by a super-absorbent flame-retarding foam that provides an effective cushion for the optical fibers. The foam comprises a super-absorbent powder, which provides water-blocking and flame-retarding properties. Preferably, the foam is provided with a moisture content of greater than approximately zero (0) percent, by weight, thereby improving the flame-retarding characteristics of the tape. Additionally, the SAPs can include polyacrylates, polyacrylamides, polyvinylalcohols and combinations thereof, including copolymers.

In accordance with another aspect of the present invention, an embodiment of the foam-filled core incorporates the foam both inside the core tube and between the core tube and the outer jacket so as to fill all interstitial spaces and fully utilize the cushioning and locating properties of the foams. The foam of this embodiment can include a moisture content of greater than approximately 0 percent, by weight.

In another aspect of the present invention, an embodiment of the foam-filled core incorporates the foam placed intermittently in the form of a foam plug (or foam cylinder) both inside the core tube and between the core tube and the outer jacket. The foam of this embodiment can include a moisture content of greater than approximately 0% by weight.

The numerous features and advantages of the present invention will be more readily apparent from the following detailed description read in conjunction with the accompanying drawings.

BRIEF DESCRIPTION OF THE SEVERAL VIEWS OF THE DRAWINGS

The accompanying drawings incorporated in and forming a part of the specification, illustrate several aspects of the present invention, and together with the description serve to explain the principles of the invention. In the drawings.

DETAILED DESCRIPTION OF THE PREFERRED EMBODIMENT

Figure 1:
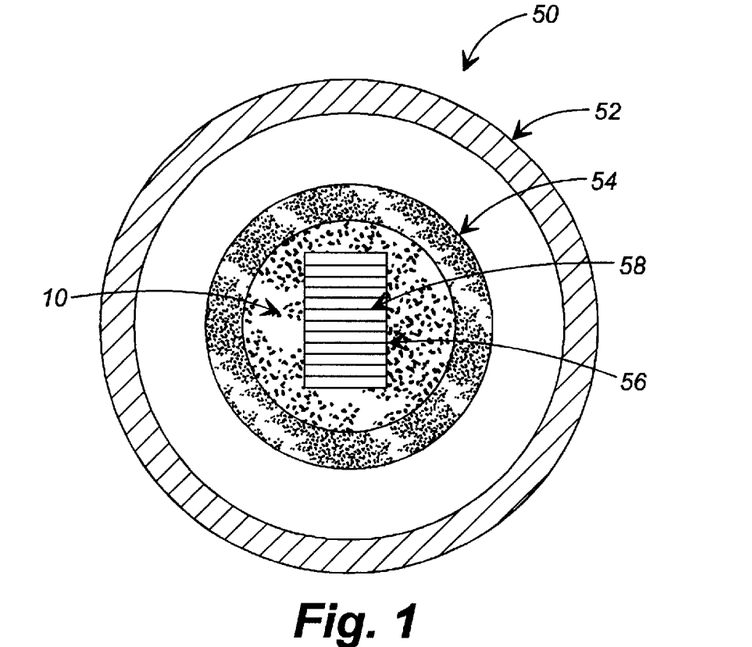
FIG. 1 is a cross-sectional end view of a representative cable incorporating a preferred embodiment of the foam of the present invention, with the foam being incorporated into the core tube.
Figure 2:
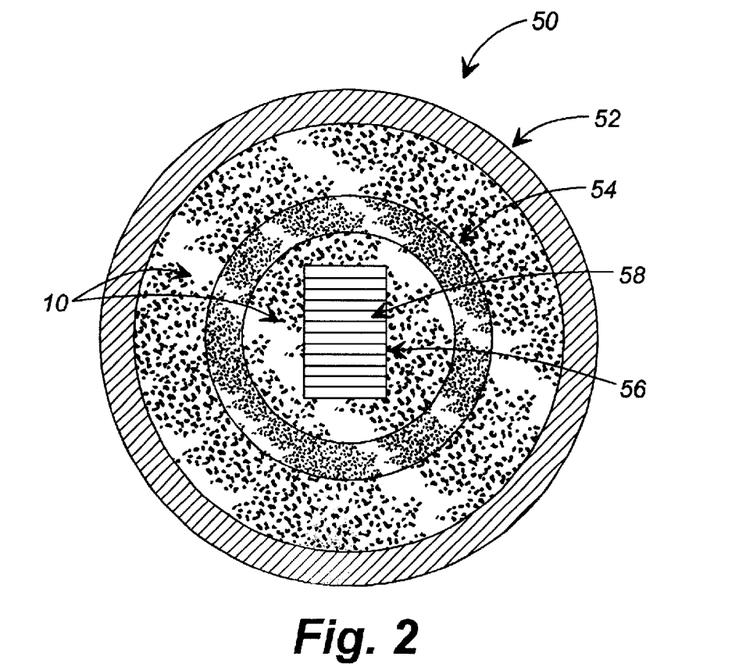
FIG. 2 is a cross-sectional end view of a representative cable incorporating a preferred embodiment of the foam of the present invention, with the foam being incorporated into the core tube and filling all interstitial spaces between core tube and outer jacket.

Reference will now be made in detail to the description of the present invention as illustrated in the drawings, wherein like reference numbers indicate like parts throughout the several views. In accordance with an aspect of the present invention, a water-blocking, super-absorbent foam is provided which also possesses heretofore unrecognized flame-retarding characteristics. As shown in FIG. 1, one embodiment of the cable 50 of the present invention incorporates a super-absorbent foam 10 inside the core tube 54. The foam 10 exhibits both water-blocking and flame-retarding characteristics. As shown in FIG. 2, in a preferred embodiment the foam 10 is tightly packed into both the core tube and in the area between the core tube and the outer jacket so as to form a physical barrier to the flow of water, as well as to cushion and center the optical fibers within the core tube. The super-absorbent foam 10 comprises a foam material that is loaded with super-absorbent polymers (SAPs). Preferably, the SAPs include polyacrylates, polyacrylamides, polyvinylalcohols and combinations thereof, including copolymers.

The foam is made of a compliant material. Such a material is available commercially and may be one such as the super-absorbent polyurethane foam disclosed in U.S. Pat. No. 4,725,628 which issued on Feb. 16, 1988 and which is incorporated herein by reference. In a preferred embodiment, the super-absorbent polyurethane foam contains a plurality of polycarbonyl moieties covalently attached to the polyurethane through at least one urethane, thiourethane, or urea linkage. The polycarbonyl moieties comprise from about 5 to about 100 carbonyl-containing repeating units which may be the same or different. Also, the carbonyl portions are selected from the group consisting of carbamoyl, substituted carbamoyl, and carboxy and alkali metal and ammonium salts thereof The polyurethane is derived form an isocyanate-terminated poly (oxyalkylene) polyol having an isocyanate functionality greater than 2, whereas the polycarbonyl moieties are derived from acrylate or methacrylate salts, i.e. alkali metal or ammonium salts of acrylic or methacrylic acid.

Processes for making super-absorbent polyurethane foams are disclosed in the above-identified U.S. Pat. No. 4,725,628. A method of preparing a super-absorbent polyurethane foam is disclosed in U.S. Pat. No. 5,016,952, which issued on May 21, 1991, and which is incorporated by reference herein. Further, processes for making super-absorbent polyurethane foam material are disclosed also in U.S. Pat. Nos. 4,725,629 and 4,725,391, each of which is incorporated by reference herein. Another material suitable for use as a foam is referred to as Sanfoam# super-absorbent foam. This product is available from Hoechst Celanese Corporation and has relatively high absorbence for aqueous liquids.

The foam of the current invention may be present in the cable in various forms. First, it may be packed tightly into the cable so as to fill all interstitial spaces. Second, the foam may be in the form of various geometric forms such as sponge plugs (cylinders) or squares. The SAPs are loaded in the foam prior to the insertion of the foam into the cable.

As discussed hereinbefore, to provide the desired characteristic of water-blocking, a prior art solution has been to provide a water-blocking system inside the core in the form of a tape or yarn. The tapes and yarns can be awkward to use, difficult to manufacture and place in the correct position around the transmission medium and do not lend themselves to being tightly packed within the core. The tapes and yarns must be disposed in the core in such a manner as to intentionally create voids that will allow motion of the transmission medium in at least one transverse direction when the cable is stressed, such as by bending of the cable, thereby potentially inducing micro-bending and macro-bending losses. By creating the voids, the prior art leaves open the possibility of the water-blocking system not swelling sufficiently enough to prevent the migration of water to the transmission medium. Furthermore, the foam of the current invention can be provided with a much higher loading of SAPs than the tapes.

The current invention addresses the problems of the cables of the prior art which incorporate the water-blocking tapes and yarns. The super-absorbent foams are relatively easy to manufacture and place within the outer jacket of a cable, such as within the core tube. Further, the foam can be tightly packed in the core so as fill all interstitial spaces, thereby reducing the possibility that water can migrate to the transmission medium, and the induced micro-bending loss; or placed intermittently in the form of a foam plug depending on the application. Finally, the super-absorbent foam can be provided in various shapes and sizes, depending on the application.

As described hereinbefore, a prior art solution to achieve the desired characteristics of water-blocking and flame-retarding in tapes has been to add prior art flame-retardants, such as magnesium hydroxide or zinc borates, among others, which are salts or ionic compounds, to the SAPS (super-absorbent polymers, usually sodium polyacrylates) of the tapes. However, when prior art flame-retardants are added to the SAPs of the tapes, the SAPs' ability to absorb water can be significantly reduced, thereby resulting in tapes with marginal water-blocking capability. For example, a gram of SAPs typically only can absorb approximately 1000 ml of distilled water. However, a gram of the same SAPs typically can absorb up to approximately 50 ml of sea water, which commonly includes multiple ion species, i.e. monovalent and divalent ions of sodium, magnesium, etc. The mechanism by which SAPs absorb and retain water has been described in the copending U.S. patent application, Ser. No. 09/258,491 and Ser. No. 09/258,533, both filed on Feb. 26, 1999, the disclosures of which are incorporated herein by reference.

As discussed hereinbefore, foams possessing the combined characteristics of water-blocking and flame-retarding are desired in many applications. Heretofore, a prior art solution to provide the desired characteristics of water-blocking and flame-retarding has been to add flame-retardants to SAPs of a tape, for instance. Prior art non-halogen flame-retardants are preferred in many applications because they do not release acidic or toxic halogen containing acid/gas during burning. However, the addition of prior art flame-retardants oftentimes results in a SAP composition which has reduced water-blocking characteristics as compared to the SAP before the flame-retardants were added. Reasons for these also have been described in the prior three copending U.S. patent application Ser. No. 09/258,491 and Ser. No. 09/258,533, both filed on Feb. 26, 1999 and U.S. patent application Ser. No. 09/392,166, filed on Sep. 8, 1999. It has been discovered that SAPs possess heretofore unknown flame-retarding characteristics. Moreover, in accordance with the present invention (as shown in detail hereinafter), super-absorbent foam can be utilized as flame-retardants and/or flame-retarding additives, such as by adding SAPs of prior art water-blocking tapes, for instance, to the foam, or by increasing the moisture content of the super-absorbent foam.

The mechanism or mechanisms by which the flame-retarding characteristics of materials are improved by practicing the present invention are not heretofore fully understood; however, the release of water molecules absorbed by and/or bonded to super-absorbent foams the release of carbon dioxide molecules from the carboxylates of the super-absorbent polymers, as well as the release of nitrogen and consumption of oxygen are considered important. Typically, in order to stop a fire, it is necessary to stop the combustion reaction of the fire. Fires generally are controlled and extinguished by, among others, cooling of the burning substrate and separating and/or replacing an oxidizing agent (air or oxygen). For example, water is an effective fire extinguishing agent because it possesses higher specific and latent heats (heat of evaporation, etc.) than those of most other extinguishing agents. On the other hand, carbon dioxide extinguishes fire by blanketing and smothering, thereby preventing oxygen from reaching the fire and the substrate. Once blanketing is maintained long enough to cool the substrate below the self-ignition temperature of the substrate, the fire is extinguished.

As discussed hereinbefore, SAPs incorporated into the foam generally are capable of absorbing and bonding with water molecules. During a burning process of super-absorbent foam, water molecules absorbed, bonded and/or converted typically are released, thereby helping to extinguish a flame. However, even when no excess water has been absorbed into the network of the super-absorbent foam, as described in detail hereinafter, the super-absorbent foam typically exhibits the aforementioned improvement in flame-retarding characteristics. Therefore, it is hypothesized that carbon dioxide molecules of the super-absorbent polymers also may be released during burning, such as from the carboxylates of polyacrylic acids and polyacrylates, thereby helping to extinguish the flame. As mentioned hereinbefore, both carbon dioxide and water help in extinguishing fire.

In order to demonstrate the aforementioned water-blocking and flame-retarding characteristics of the present invention, two series of tests (e.g. test series I–II) were conducted. The first series of tests was utilized to determine the effect of adding moisture to the foam upon the limiting oxygen indexes (LOIs) of super-absorbent foam samples. The second series of tests was utilized to determine the effect of increasing the loading of SAPs in the foam upon the LOIs of the super-absorbent foam samples.

Test samples were prepared utilizing commercially available SAPs, Aqua keep J550A, a polyacrylate-type SAP manufactured by Sumitomo Seika Chemicals.

Test Series I

These tests were conducted in accordance with a modified version of standard ASTM procedures (designation: D 2863-95). These tests were used to measure the minimum oxygen concentrations required to support candle-like combustion of SAPs incorporated into a foam.

Figure 3:
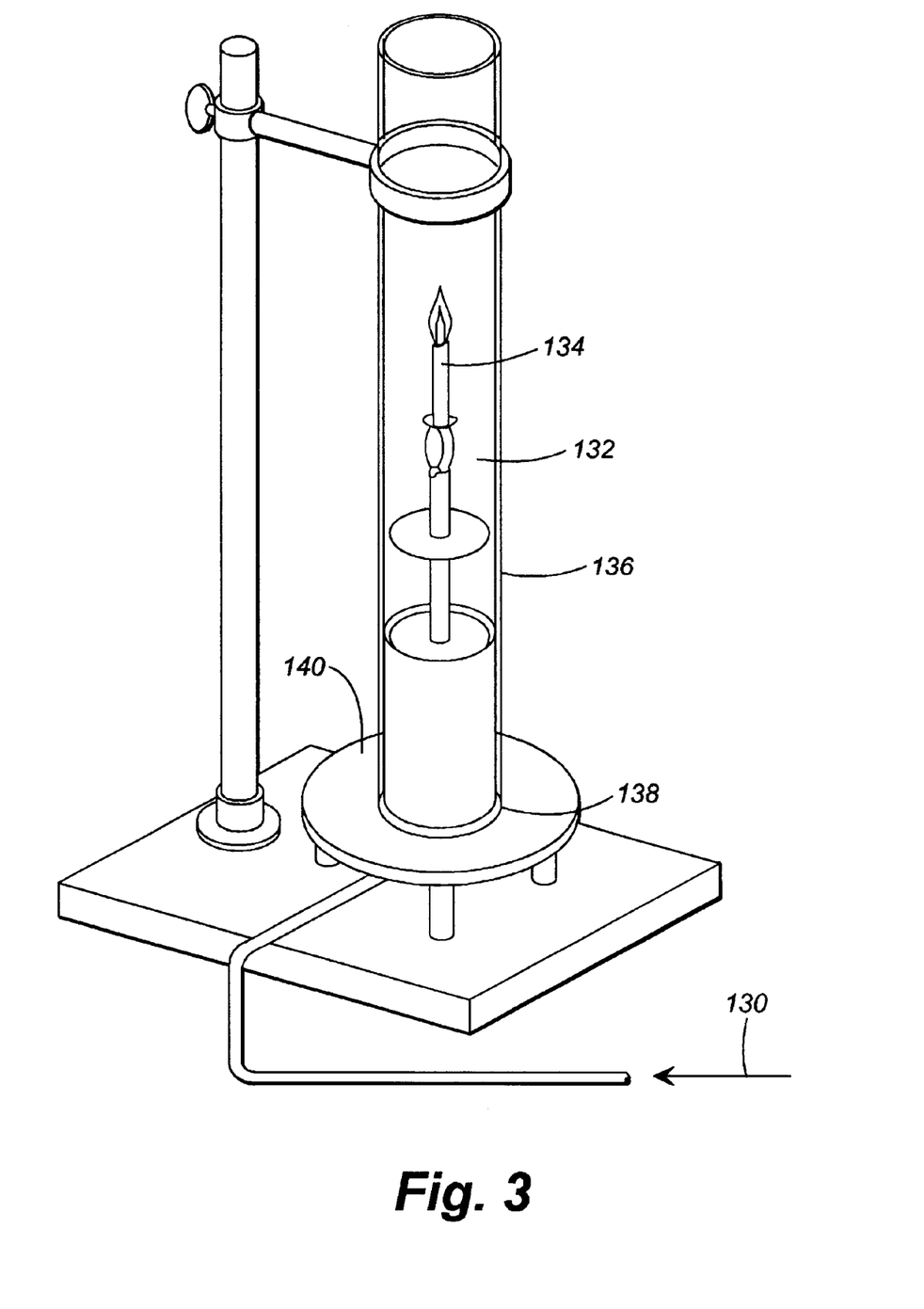
FIG. 3 is a perspective view of representative test equipment utilized in analyzing physical properties of super-absorbent foams.

In accordance with the aforementioned ASTM test procedures, the minimum concentration of oxygen, in a mixture 130 (FIG. 3) of oxygen and nitrogen flowing upward in a test column 132, that will just support combustion was measured under equilibrium conditions of candle-like burning. The equilibrium was established by the relation between heat generated from the combustion of a specimen 134 formed from a superabsorbent foam, and heat lost to surroundings as measured by one of two arbitrary criteria, namely: (1) time of burning, or (2) length of composition burned. Test column 132 incorporated a heat resistant glass tube 136 which included a 75 mm minimum inside diameter and a 45 mm minimum height. The bottom 138 of the column was attached to a noncombustible base 140 which was adapted to mix and evenly distribute a gas mixture 130 entering column 132 through base 140. Each specimen 134 was placed within the column and a controlled flow of mixture 130 was allowed to enter the column. The specimen was then ignited with an ignition flame (not shown). The ignition flame was then removed and a timer started. Burning of each specimen was evaluated in accordance with standard ASTM procedures. The aforementioned procedures were then repeated with differing concentrations of oxygen until a critical concentration of oxygen was determined. Critical concentration of oxygen is defined as the lowest oxygen concentration that will yield standardized burn test results. Limiting Oxygen Index (LOI) then was calculated by the following equation:

$$LOI = (100 \times O_2)/(O_2 + N_2)$$

where: $O_2$ is the volumetric flow of oxygen (mm$^3$/s) corresponding to the critical concentration; and $N_2$ is the volumetric flow of nitrogen (mm$^3$/s) corresponding to the critical concentration.

In order to demonstrate the effect of moisture content on the flame-retardance of foams, the LOI was determined for several sets of samples.

EXAMPLE 1-1

The foam samples were each coated in the SAP powder by submerging the foam in distilled water, pressing the air out, removing the foam from the water and placing it in a large container containing J550A, and tossing to coat. The foam was then removed and allowed to air dry. Different loadings of powder were achieved by shaking some water off before placing the foam in the container to toss, or by knocking some of the powder off after the foam had dried. Representative characteristics of the samples are shown hereinafter in Table 1.

TABLE 1

Limiting Oxygen Index (J550A, foam plug, cylinder ¾" tall, ¾" diameter)

| Sample | Sample Type | Wt. Powder | Wt. Water | g/ft2 |
|---|---|---|---|---|
| 1 | UFP Tech. Fiber Cleaners | 0.0000 | 0.0006 | 0 |
| 2 | UFP Tech. F.C., w/J550A | 0.8306 | 0.0157 | 45.1 |
| 3 | UFP Tech. F.C., w/J550A | 0.1879 | 0.0139 | 10.2 |
| 4 | UFP Tech. F.C., sponge plugs w/J550A | 0.2320 | 0.0128 | 12.6 |
| 5 | UFP Tech. F.C., w/J550A | 0.2250 | 0.0755 | 12.2 |

These samples were then subjected to the modified ASTM testing, as described hereinbefore. These tests were used to measure the minimum oxygen concentrations required to candle-like combustion of SAPs incorporated into the foams along with varying moisture contents in order to demonstrate the added advantage of increasing the moisture content of the SAPs in the foam. The LOI for each moisture content is shown hereinafter in Table 2.

TABLE 2

Limiting Oxygen Index (Aqua Keep J550A)

| Sample | % Moisture | LOI | Smoke/comments |
|---|---|---|---|
| 1 | 0.5 | 20.0% | 6 plugs on a brush stick, black smoke, nothing leftover |
| 2 | 13.5 | 34.8% | 5 plugs on brush stick, black smoke, black powder residue |
| 3 | 12.0 | 26.9% | 5 plugs on brush stick, black smoke, black powder residue |
| 4 | 11.0 | 34.2% | |
| 5 | 65.1 | 82.7% | |

Figure 4:
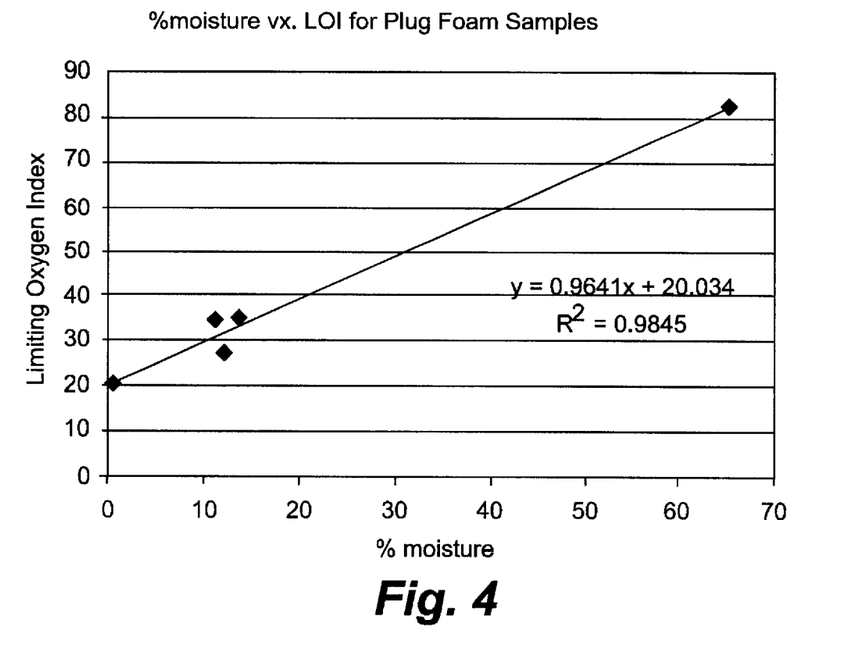
FIG. 4 is a graph illustrating Limiting Oxygen Index versus % Moisture for a representative SAP utilized in a preferred embodiment of the super-absorbent foam in the form of plugs.

A summary of the information in Table 2 is depicted in FIG. 4. As shown therein, limiting indexes of the foam increase as the moisture content in the foam increases.

EXAMPLE 1-2

The foam was prepared as described hereinbefore. Representative characteristics of the sample are shown hereinafter in Table 3.

TABLE 3

Limiting Oxygen Index (J550A Powder, foam, blue 1" square, ¼" thick

| Sample | Sample Type | Wt. Powder | Wt. Water | g/ft2 |
|---|---|---|---|---|
| 6 | Blue sponge squares | 0.0000 | 0.0019 | 0.0 |
| 7 | Blue sponge squares w/J550A | 0.1506 | 0.0148 | 6.8 |
| 8 | Blue sponge squares w/J550A | 0.2966 | 0.0169 | 13.3 |
| 9 | Blue sponge squares w/J550A | 0.1344 | 0.0109 | 6.0 |
| 10 | Blue sponge squares w/J550A | 0.2271 | 0.0076 | 10.2 |

The LOI for each moisture content is shown hereinafter in Table 4.

TABLE 4

Limiting Oxygen Index (Aqua Keep J550A)

| Sample | % Moisture | LOI | Smoke/comments |
|---|---|---|---|
| 6 | 0.8 | 21.1% | Green flame, white smoke, black ashes, on a brush stick |
| 7 | 6.4 | 29.3% | White smoke, on a brush stick, slow burning embers, no flame. |
| 8 | 7.3 | 31.7% | White smoke, on a brush stick |
| 9 | 4.7 | 27.0% | White smoke, on a brush stick |
| 10 | 3.3 | 29.4% | White smoke, on a brush stick |

Figure 5:
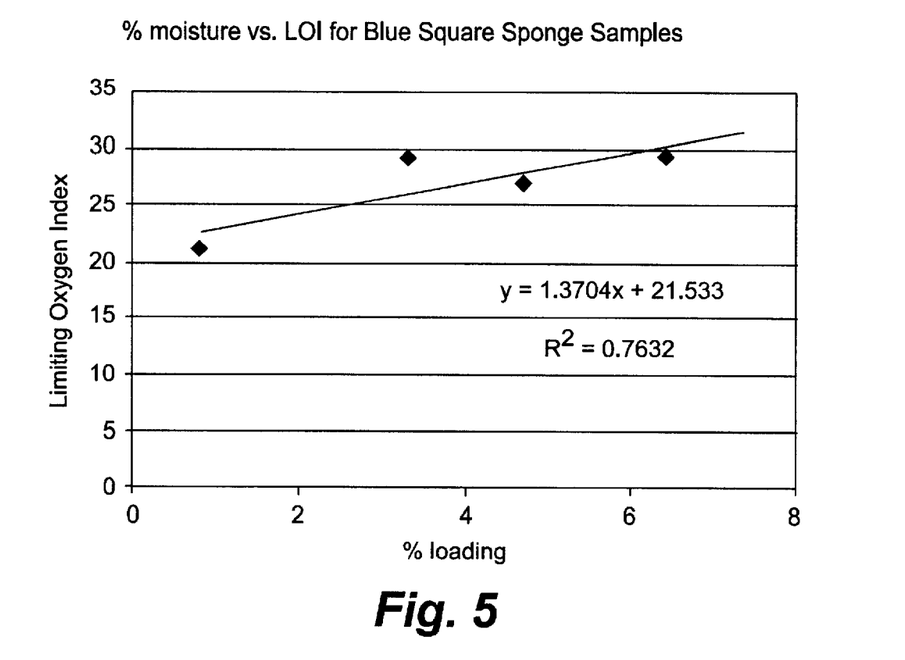
FIG. 5 is a graph illustrating Limiting Oxygen Index versus % Moisture for a representative SAP utilized in the super-absorbent foam in the form of blue square sponge foam samples.
Figure 6:
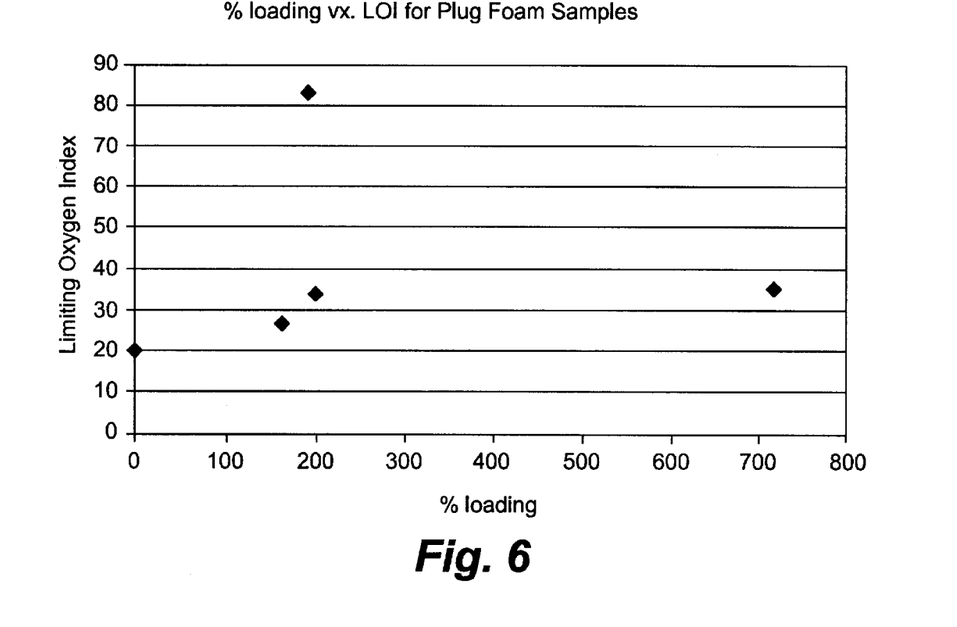
FIG. 6 is a graph illustrating Limiting Oxygen Index versus % Loading for a representative SAP utilized in the super-absorbent foam in the form of plugs.

A summary of the information in Table 4 is depicted in FIG. 5. As shown therein, limiting oxygen indexes of the foam increase as the moisture content in the foam increases. Thus, the LOIs of the SAPs contained in the plug foams (samples 1–5) and blue square sponge foams (samples 6–10) increase as the moisture content in their SAPs increase. Therefore, it is hypothesized that the water molecules absorbed and bonded by these SAPs enhance the flame-retardancy of the foams.

Test Series II

These tests were conducted in accordance with the modified version of standard ASTM procedures, as described hereinbefore. These tests were used to measure the minimum oxygen concentrations required to support candle-like combustion of SAPs incorporated into the foams along with a varying amount of SAPs in order to demonstrate the added advantage of increasing loading of the SAPs in the foam.

EXAMPLE 2-1

The LOI for each loading (referring to samples 1–5 as described hereinbefore) is shown hereinafter in Table 5.

TABLE 5

Limiting Oxygen Index (Aqua Keep J550A)

| Sample | % Loading | LOI | Smoke/comments |
|---|---|---|---|
| 1 | 0 | 20.0% | 6 plugs on a brush stick, black smoke, nothing leftover |
| 2 | 716 | 34.8% | 5 plugs on brush stick, black smoke, black powder residue |
| 3 | 162 | 26.9% | 5 plugs on brush stick, black smoke, black powder residue |
| 4 | 200 | 34.2% | |
| 5 | 194 | 82.7% | |

Figure 7:
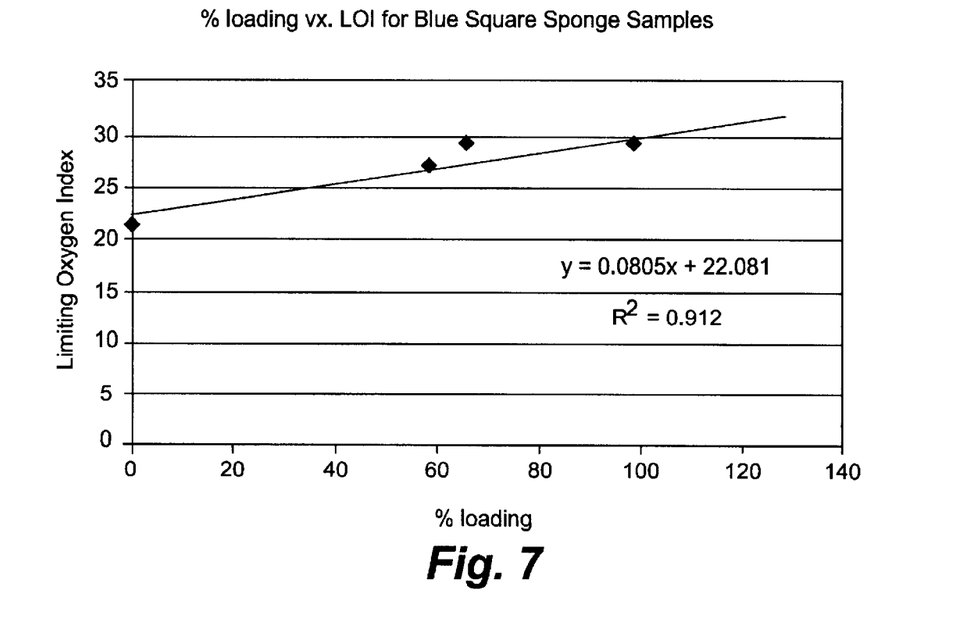
FIG. 7 is a graph illustrating Limiting Oxygen Index versus % Loading for a representative SAP utilized in the super-absorbent foam in the form of blue square sponge foam samples.

A summary of the information in Table 5 is depicted in FIG. 7. As shown therein, limiting oxygen indexes of the foam increase as the SAP loading in the foam increases.

EXAMPLE 2-2

The LOI for each loading (referring to samples 6–10 as described hereinbefore) is shown hereinafter in Table 6.

TABLE 6

Limiting Oxygen Index (Aqua Keep J550A)

| Sample | % loading | LOI | Smoke/comments |
|---|---|---|---|
| 6 | 0 | 21.1% | Green flame, white smoke, black ashes, on a brush stick |
| 7 | 65 | 29.3% | White smoke, on a brush stick, slow burning embers, no flame. |
| 8 | 128 | 31.7% | White smoke, on a brush stick |
| 9 | 58 | 27.0% | White smoke, on a brush stick |
| 10 | 98 | 29.4% | White smoke, on a brush stick |

A summary of the information in Table 6 is depicted in FIG. 7. As shown therein, limiting oxygen indexes of the foam increase as the SAP loading in the foam increases.

Observations

Figure 8:
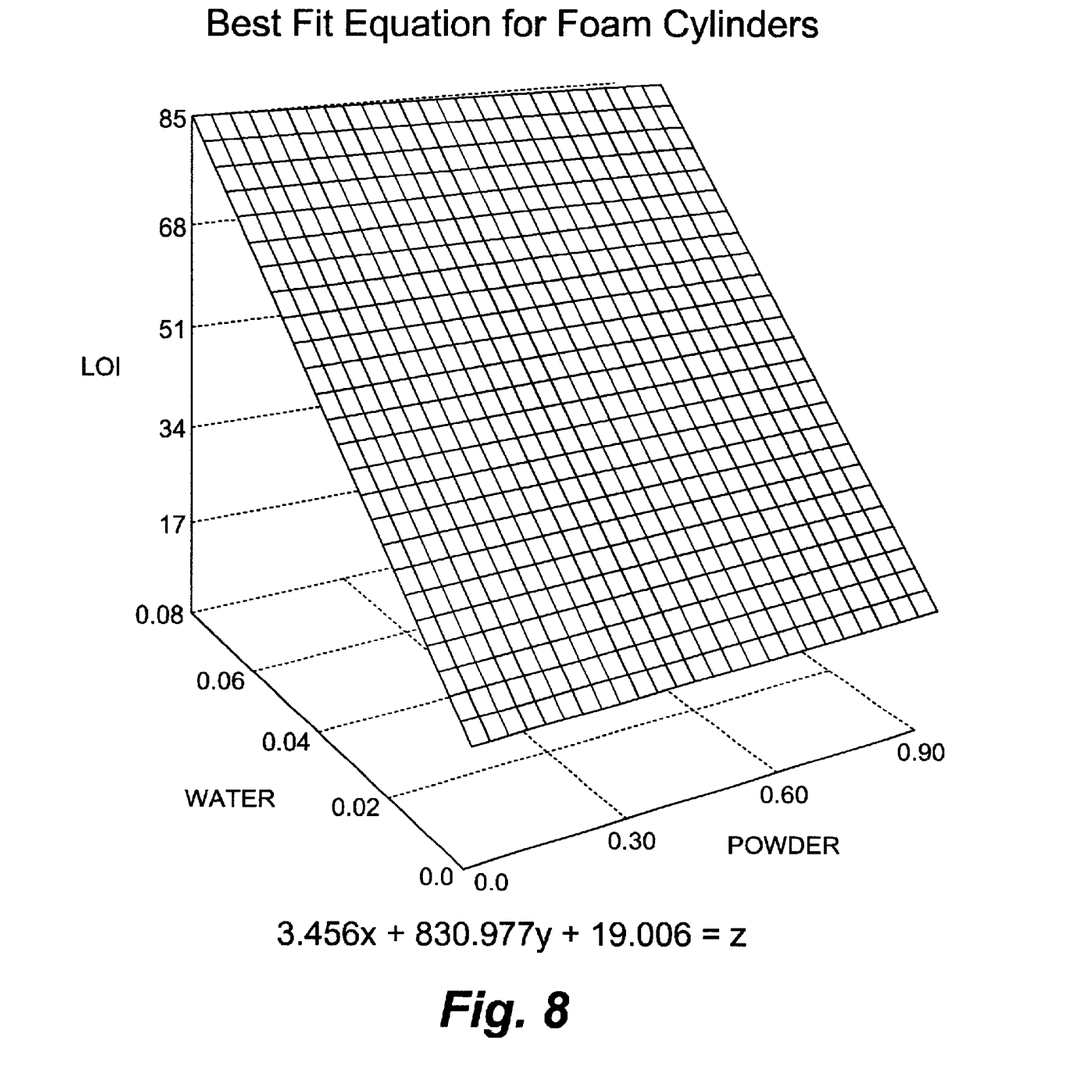
FIG. 8 is a graph of the Best Fit Equation for Foam Cylinders, with the variables being LOI, water, and powder.
Figure 9:
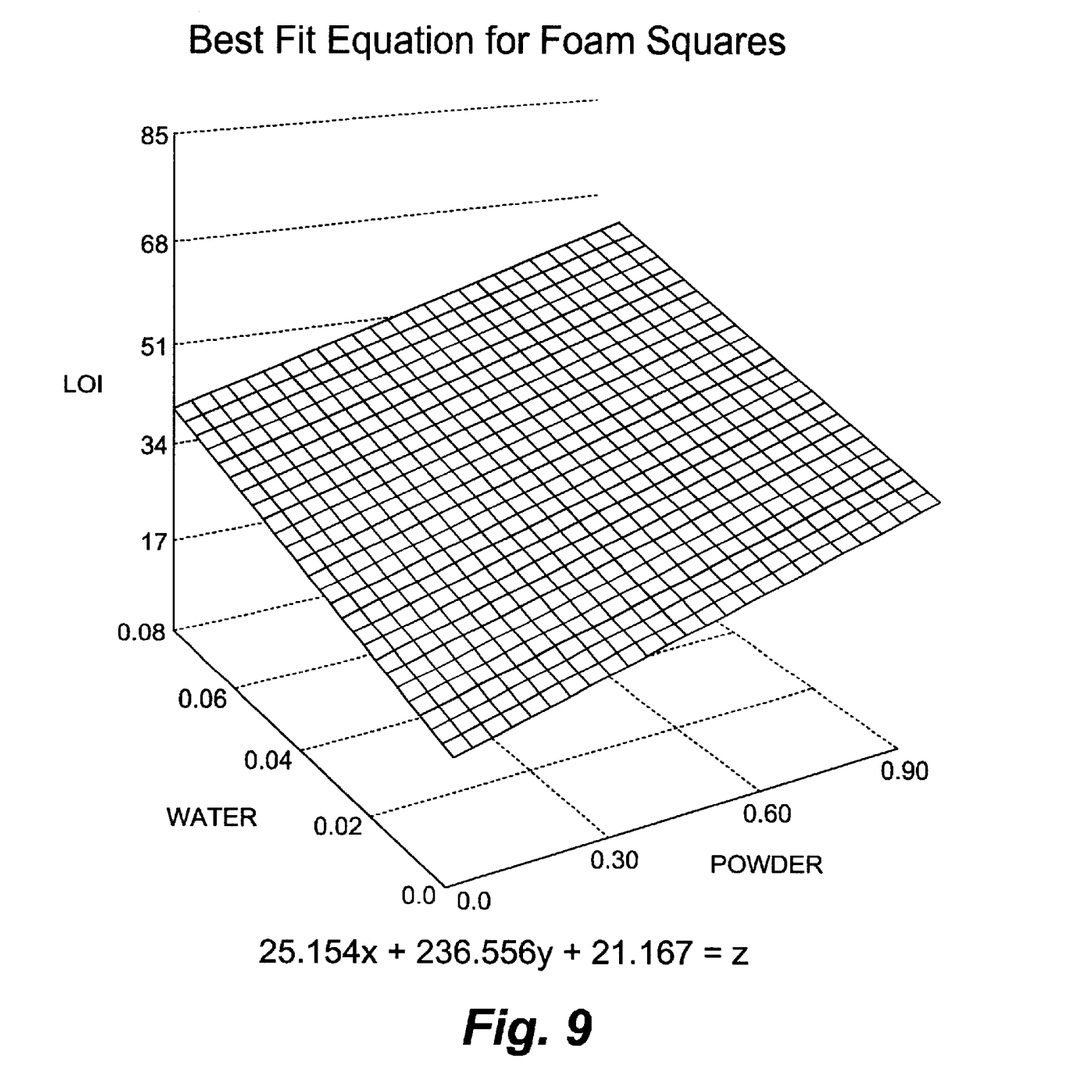
FIG. 9 is a graph of the Best Fit Equation for Foam Squares, with the variables being LOI, water, and powder.
Figure 10:
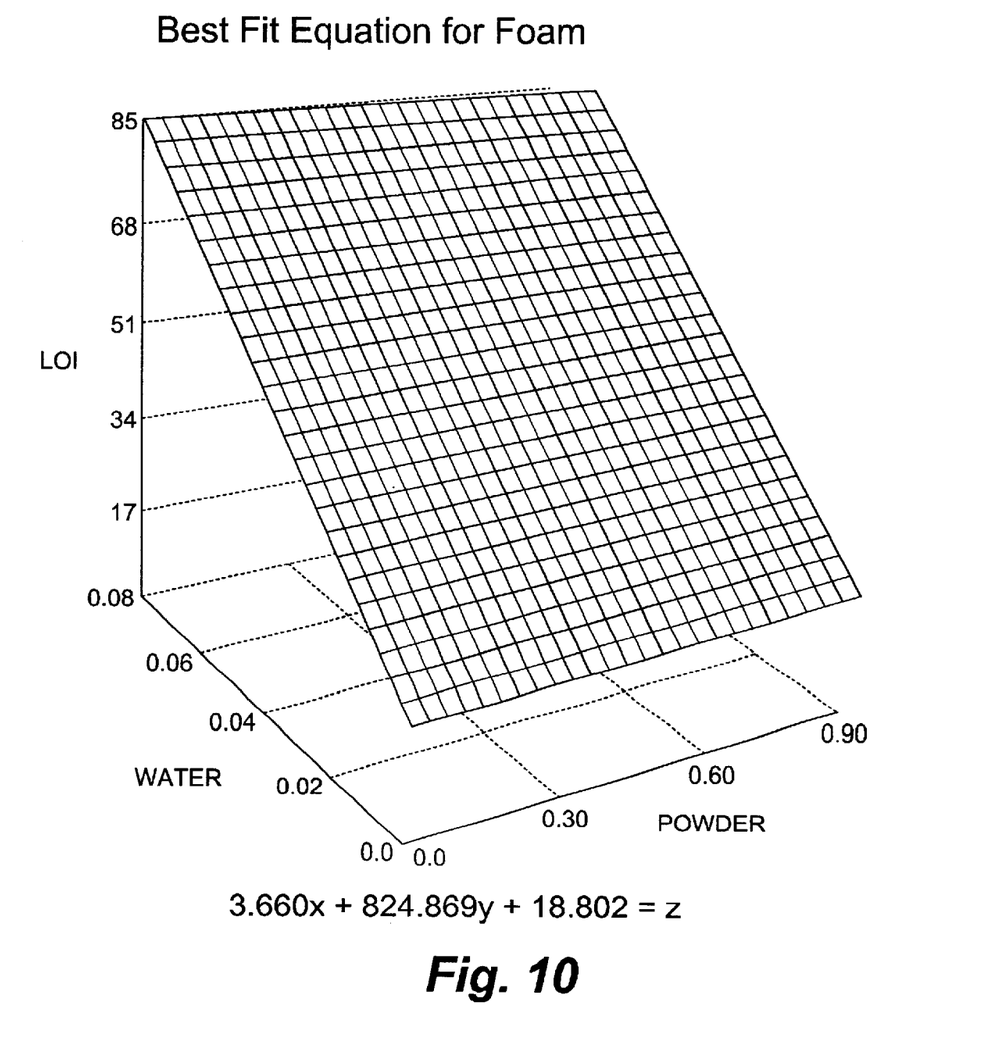
FIG. 10 is a graph of the Best Fit Equation for the Foam, with the variables being LOI, water, and powder.

Test data obtained during the aforementioned test series revealed the following: (1) the of SAPs to the foam composition increases the LOI of the foam composition and, in this instance increases the LOI in an amount directly proportional to the amount of SAPs added; and (2) the LOIs of super-absorbent foam increases as the moisture content in the super-absorbent foam increases. Graphs that correlate LOI, % moisture, and loading of SAPs for foam plugs (cylinders), foam squares and foam itself are depicted in FIGS. 8, 9 and 10, respectively. The best fit equation for each graph is shown in Table 7.

TABLE 7

Best Fit Equation Data For the Various Foam Forms.

| Foam Form | Best Fit Equation |
|---|---|
| Cylinders | $3.456x + 830.977y + 19.006 = z$ |
| Squares | $25.154x + 236.556y + 21.167 = z$ |
| Foam | $3.660x + 824.869y + 18.802 = z$ | where x equals the mass of the powder in grams, y equals the mass of water in grams, and z equals the LOI.

The foam 10 of the present invention effectively utilizes SAPs as additives for imparting both flame-retarding and water-blocking characteristics to the foam. This is accomplished without compromising the total water-absorbing capacity of the foam, such as was common when practicing the prior art, e.g. adding prior art flame-retardants (salts) to the SAPs of water-blocking tapes.

For ease of description, and not for purposes of limitation, foam 10 incorporating between 0 grams and 45.1 grams of SAPs per square foot were utilized during the aforementioned test series. Additionally, moisture content varied between approximately 0.5 percent and approximately 65 percent, by weight. Both the amount of SAPs utilized and the moisture content of the SAPs utilized in a particular application may, however, vary depending upon the needs of the application. In particular, SAPs loaded near the high end of the experimental range were found to produce the optimal water-blocking and flame-retarding characteristics.

In accordance with one aspect of the present invention, foam 10 can be incorporated directly into structures such as cable 50 (FIG. 1), for instance. Cable 50 incorporates an outer jacket 52, formed of plastic, which surrounds a core tube 54. Core tube 54 includes transmission medium 56, such as optical fiber 58. Foam 10 are also provided inside core tube 54 so as to fill all interstitial spaces in order to cushion and center optical fibers and further protect from flame and water. So configured, foam 10 provides a water-blocking layer between the outer jacket and the transmission medium, thereby potentially preventing water from entering the core. Furthermore, as shown in FIG. 2, foam 10 is provided so as to fill all interstitial spaces between outer jacket 52 and core tube 54.

The foregoing description has been presented for purposes of illustration and description. It is not intended to be exhaustive or to limit the invention to the precise forms disclosed. Obvious modifications or variations are possible in light of the above teachings. The embodiment discussed, however, was chosen and described to provide the best illustration of the principles of the invention and its practical application to thereby enable one of ordinary skill in the art to utilize the invention in various embodiments and with various modifications as are suited to the particular use contemplated. All such modifications and variations, are within the scope of the invention as determined by the appended claims when interpreted in accordance with the breadth to which they are fairly and legally entitled.

What is claimed is:

1. A cable comprising:

at least one core tube, said at least one core tube having a transmission medium disposed therein;

an outer jacket surrounding said at least one core tube; and water-absorbing foam disposed within said at least one core tube, wherein said water-absorbing foam has improved flame-retarding ability and a moisture content of greater than approximately 0.5 percent, by weight.

2. The cable of claim 1, with said water-absorbing foam comprises a foam material loaded with super-absorbent polymers.

3. The cable of claim 2, wherein said foam material is a polyurethane foam.

4. The cable of claim 2, wherein at least one of said super-absorbent polymers is selected from the group of polyacrylates, polyacrylamides, polyvinylalcohols, co-polymers of polyacrylates, co-polymers of polyacrylamides, co-polymers of polyvinylalcohols, co-polymers of polyacrylates and polyacrylamides, co-polymers of polyacrylates and polyvinylalcohols, and co-polymers of polyacrylamides and polyvinylalcohols.

5. The cable of claim 1, wherein said at least one core tube and said transmission medium have interstitial spaces formed therebetween, and said super-absorbent foam fills said interstitial spaces.

6. The cable of claim 1, wherein said super-absorbent foam is in the form of plugs disposed within said at least one core tube.

7. The cable of claim 6, wherein said plugs are intermittently disposed within said at least one core tube such that spaces are formed therebetween.

8. A cable comprising:

a transmission medium; and water-absorbing foam disposed about said transmission medium, wherein said water-absorbing foam has improved flame retarding ability and a moisture content of greater than approximately 0.5 percent by weight.

9. The cable of claim 8, wherein said water-absorbing foam comprises a foam material loaded with super-absorbent polymers.

10. The cable of claim 9, wherein said water-absorbing foam material is a polyurethane foam.

11. The cable of claim 9, wherein at least one of said super-absorbent polymers is selected from the group consisting of: polyacrylates, polyacrylamides, polyvinylalcohols, co-polymers of polyacrylates, co-polymers of polyacrylamides, co-polymers of polyvinylalcohols, co-polymers of polyacrylates and polyacrylamides, co-polymers of polyacrylates and polyvinylalcohols, and co-polymers of polyacrylamides and polyvinylalcohols.

12. The cable of claim 8, further comprising a core tube surrounding said transmission medium such that interstitial spaces are formed between said transmission medium and said core tube, and wherein said foam fills said interstitial spaces.

13. The cable of claim 8, further comprising a core tube surrounding said transmission medium and an outer jacket surrounding said core tube, and wherein said water-absorbing foam is disposed between said outer jacket and said transmission medium.

14. The cable of claim 8, wherein said water-absorbing foam is in the form of plugs disposed intermittently about said transmission medium.

* * * * *